(12) United States Patent
Wenzel et al.

(10) Patent No.: US 6,412,758 B1
(45) Date of Patent: Jul. 2, 2002

(54) ROLLING-LOBE AIR SPRING

(75) Inventors: Detlef Wenzel, Barsinghausen; Manfred Degenhardt, Pattensen, both of (DE)

(73) Assignee: ContiTech Luftfedersysteme GmbH, Hannover (DE)

(*) Notice: Subject to any disclaimer, the term of this patent is extended or adjusted under 35 U.S.C. 154(b) by 0 days.

(21) Appl. No.: 09/585,053

(22) Filed: Jun. 1, 2000

(30) Foreign Application Priority Data

Jun. 1, 1999 (DE) .......................................... 199 25 092

(51) Int. Cl.$^7$ ................................................. F16F 9/04
(52) U.S. Cl. ................................. 267/64.21; 267/64.27
(58) Field of Search ........................... 267/64.16, 64.19, 267/64.21, 64.23, 64.27, 122

(56) References Cited

U.S. PATENT DOCUMENTS

| | | | | |
|---|---|---|---|---|
| 2,874,458 A | * | 2/1959 | Smith | 267/64.27 |
| 2,920,885 A | * | 1/1960 | Niclas | 105/198.1 |
| 2,985,445 A | * | 5/1961 | Bowser | 280/6.158 |
| 3,013,920 A | * | 12/1961 | Harris et al. | 264/258 |
| 3,030,252 A | * | 4/1962 | Edgerly et al. | 156/191 |
| 3,895,787 A | * | 7/1975 | Niehus et al. | 267/3 |
| 4,749,345 A | * | 6/1988 | Warmuth et al. | 425/44 |
| 4,787,608 A | * | 11/1988 | Elliott | 267/64.27 |
| 5,269,496 A | | 12/1993 | Schneider | |
| 5,382,006 A | * | 1/1995 | Arnold | 267/64.27 |
| 5,580,033 A | * | 12/1996 | Burkley et al. | 267/64.24 |
| 5,671,907 A | * | 9/1997 | Arnold | 267/64.27 |

FOREIGN PATENT DOCUMENTS

| | | |
|---|---|---|
| DE | 1039375 | 9/1958 |
| DE | 29 05 791 | 8/1980 |
| DE | 298 08 109 | 8/1998 |
| JP | 60155024 A | * 8/1985 |

* cited by examiner

Primary Examiner—Christopher P. Schwartz
Assistant Examiner—Xuan Lan Nguyen
(74) Attorney, Agent, or Firm—Walter Ottesen

(57) ABSTRACT

A rolling-lobe air spring (2) has a flexible member (4), a cover plate (6) and roll-off piston (8). The bead (12) at the piston end is configured so that a contact of the bent-over edge portion (30) with the resilient member (4) takes place as late as possible to avoid an escape of the bead (12) downwardly into the free space. This is done to facilitate the attachment of a bead (12) of the flexible member at the piston end with a bent-over edge portion (30). The gap formed by bending over the edge portion when catching the bead (12) should already be closed so far that the bead (12) can no longer slip out. The bead (12) when grasped, should lie in a clamping manner against the inner surface of the contact wall. For the above purpose, the bead (12) of the flexible member (4) at the piston end is so formed thereon by vulcanization that its sealing surface (14) does not lie horizontally; instead, the sealing surface (14) is tilted at an angle ($\alpha$) of preferably 45° to 65° to the perpendicular (18) standing on the longitudinal axis (16) of the flexible member. When the bent-over operation is completed, the bead (12) at the piston end comes to lie in a 90° position to the perpendicular (18) of the longitudinal axis (16) of the flexible member.

7 Claims, 3 Drawing Sheets

ROLLING-LOBE AIR SPRING

BACKGROUND OF THE INVENTION

Air springs, as they are used for spring suspended wheel mounts, include essentially a rolling-lobe flexible member delimited by a cover plate (conical plate) on the one end and by a roll-off piston at the other end. An air spring volume is enclosed in the interior space of the rolling-lobe flexible member. The flexible member itself is made of rubber or a rubber-like plastic having attachment beads at respective ends thereof. In this connection, reference can be made, for example, to German patent publication 2,905,791.

The end of the flexible member disposed at the cover plate is usually attached by a bent-over edge. For this reason, the upper cover plate is also referred to as a bent-over edge plate. The lower edge of the flexible member or lower beaded end is usually configured as a cone provided with sealing grooves in order to be threadably engaged to a multi-part roll-off piston. The lower beaded end is provided with a clamping plate.

An air spring flexible member with a clampable sealing bead is shown in FIG. 1 of U.S. Pat. No. 5,269,496. The sealing bead is held by a bent-over edge of an upper attachment part configured as a bent-over edge plate and is clamped so as to be seal tight.

Furthermore, air springs are known wherein the end of the flexible member facing toward the roll-off piston is attached by bending over an edge. According to German Patent 1,039,375(corresponding to U.S. patent application Ser. No. 521,031, filed Jul. 11, 1955), the lower bead of the air spring flexible member is fixedly connected with that of the roll-off piston. The cylindrically-shaped roll-off piston is arranged along the same axis as the flexible member and ends in an end flange which is bent over to clamp about the bead and presses this bead against the annular edge of a cover. This cover closes the guide body and closes off the guide body relative to the flexible member. The bent-over edge is laid over the bead of the flexible member.

The roll-off piston disclosed in German patent publication 298 08 109 does have such an additional cover or clamping plate applied to the roll-off piston. Here, the piston part comprises a form body configured as one part and is connected via a bent-over edge to the flexible member so that the external peripheral wall of the roll-off piston is bent over inwardly to attach the end of the flexible member facing toward the roll-off piston. The corresponding end of the flexible member includes a bead-like annular portion which is engaged over by the bent-over edge. The annular portion is provided with a reinforcement insert.

Practical experiments for manufacturing air springs of this kind have shown that problems occur with the attachment of the flexible member to the open piston. The bead of a flexible member, which is usually formed thereon, cannot be used easily at the open roll-off piston. The sealing surface lies horizontally for a bead at the upper cover plate in order to be pressed against the upper cover plate when bending over the edge. The roll-off piston has, however, no end plate which usually serves as a counter holding surface. For this reason, the principle of bending over an edge (which is known from the horizontal cover plate) cannot be transferred to the attachment of the lower edge portion of the flexible member. A tilting of the bead by 90° is also not possible because the flexible member is produced in a mold and the occurring backcut does not permit the part to be removed from the mold (FIG. 4).

To overcome the above problems in connection with the attachment of the flexible member on an open roll-off piston by bending over a flange, the following list of requirements has been set up: the special configuration of the piston-end bead must be of such a nature that a contact of the bent-over edge with the flexible member takes place as late as possible when bending over the edge in order to avoid the bead from escaping downwardly into the free space. When the bead engages, the bent-over gap must already be so far closed that the bead can no longer slip out therefrom. The bead must immediately lay in clamping contact against the inner surface of the contact wall.

SUMMARY OF THE INVENTION

In view of the above, it is an object of the invention to configure the end of the flexible member, which faces toward the piston, so that it can be reliably connected with a bent-over flange also with a piston open at the end thereof.

The rolling-lobe air spring of the invention includes: a bendable cover plate; a roll-off piston; a rolling-lobe flexible member defining a longitudinal axis and having a first end connected to the bendable cover plate and having a second end facing toward the roll-off piston; the rolling-lobe flexible member having a bead formed on the second end and the bead having a sealing surface for contact engagement with the roll-off piston; and, the bead being formed on the flexible member by vulcanization in such a manner that the sealing surface lies tilted at an angle ($\alpha$) with respect to a perpendicular to the longitudinal axis.

According to a feature of the invention, the piston-end bead portion can be connected with a bent-over flange connection to a one-piece sheet metal roll-off piston without additional attachment parts such as a clamping plate and the like. This contributes to a reduction of the components of the overall system.

The piston-end bead of the flexible member is configured at 45° to the horizontal so that no backcuts are present either at the mold for vulcanization or on the product. In this way, no forming difficulties result. The bead is thereby so stable as to its form that a roll-off piston can be connected thereto with a bent-over edge portion. A backcut or undercut is a detail in a molded piece which is larger thatn the opening of the mold. Undercuts are also referred to as a backtaper and are explained, for example, in the test "Plastics Technical Dictionary" of A. M. Wittfoht, published by Hanser International (1983), page 204.

The bead configuration having seal surface inclinations between 45° and 65° have been shown to be especially advantageous. The bead pivots into a 90° position to the horizontal with the inwardly-directed process of bending over the edge portion.

The reduction of diameter in the lower region of the flexible member is only necessary for facilitating the formation of the rolling lobe during operation of the air spring flexible member. The diameter of the bead core and the diameter of the piston wall are matched to each other.

BRIEF DESCRIPTION OF THE DRAWINGS

The invention now be described with reference to the drawings wherein.

DESCRIPTION OF THE PREFERRED EMBODIMENTS OF THE INVENTION

Figure 1:
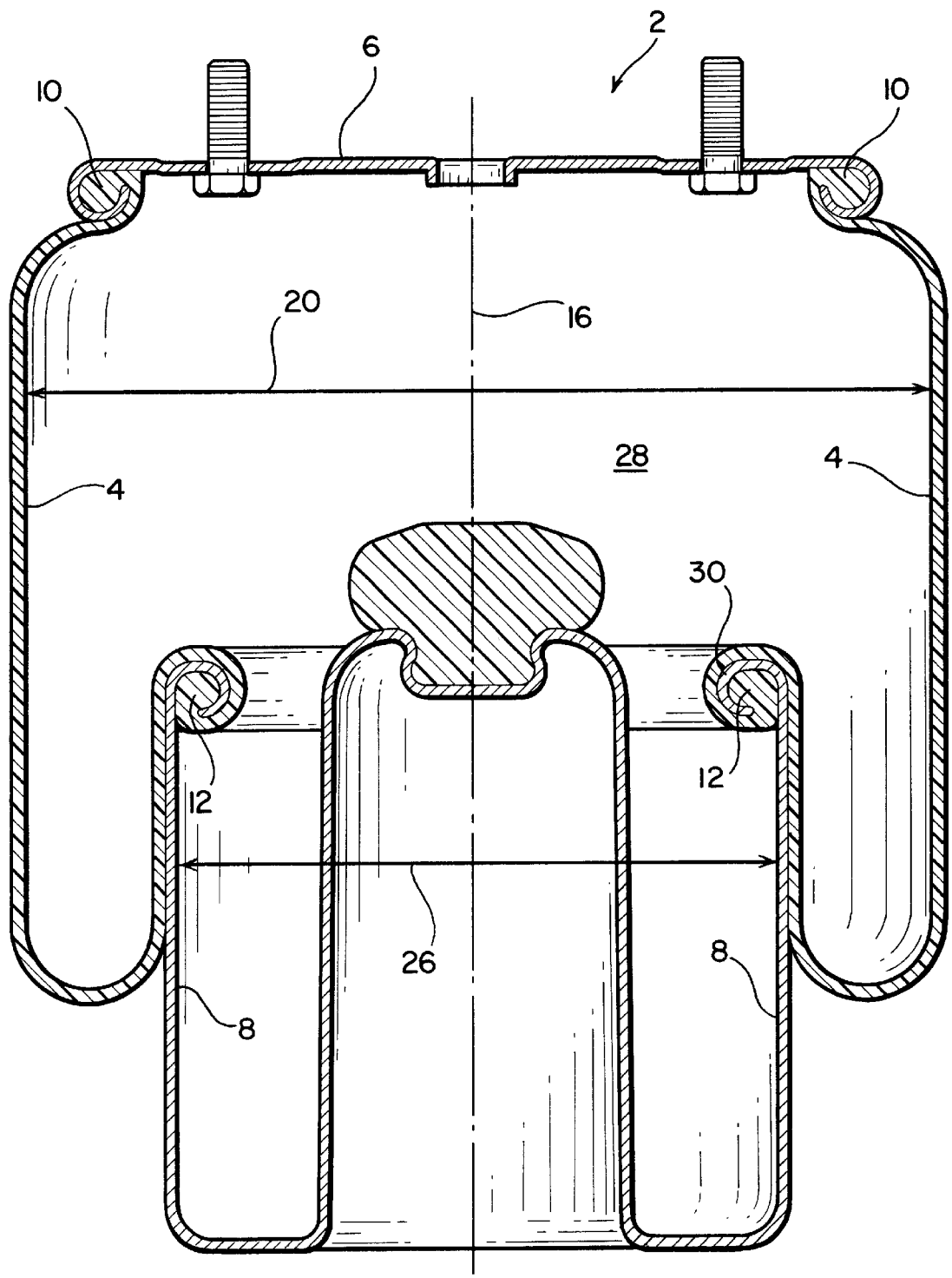
FIG. 1 is a longitudinal section view taken through a rolling-lobe air spring according to an embodiment of the invention.

The rolling-lobe air spring shown in FIG. 1 includes essentially a flexible member 4 made of rubber or a rubber-like plastic, a cover plate 6 and a roll-off piston 8. The flexible member 4 is provided with beads (10, 12) at respective ends thereof. The upper bead 10 is connected to the cover plate 6 by bending over the edge thereof; whereas, the bead 12 at the piston end is attached to a bent-over edge 30 of the roll-off piston 8. The flexible member is delimited by the cover plate 6 and the roll-off piston 8 and encloses the interior space 28 of the air spring.

Figure 2:
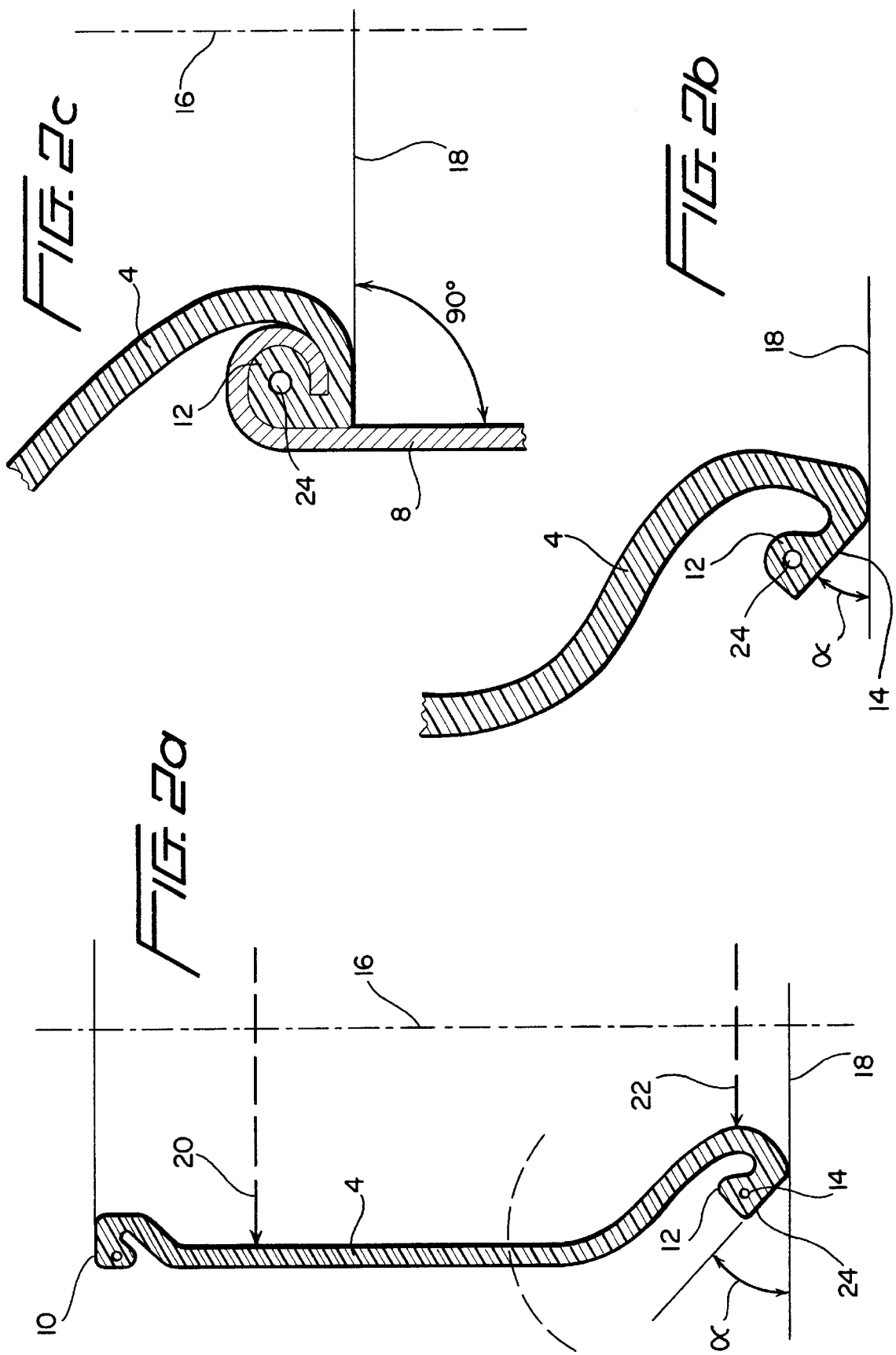
FIG. 2a is a detail of the flexible member in longitudinal section.
FIG. 2b is a detail view of the end of the flexible member facing toward the piston and is also in longitudinal section.
FIG. 2c is a detail view showing the end of the flexible member at the piston end in addition to the bent-over edge of the roll-off piston.

Essential details of the rolling-lobe air spring according to the invention are shown in FIGS. 2a to 2c. The flexible member 4 is shown with one side thereof in longitudinal section in FIG. 2a. The flexible member 4 has bead-shaped thickenings at its two ends. The upper bead 10 is configured in the conventional manner and functions for attaching the flexible member 4 to the cover plate 6. The lower bead 12 of the flexible member is provided for attachment to the roll-over piston 8 and is adapted individually to the bent-over edge portion 30 of the roll-off piston 8 which is open at the top thereof. The piston 8 shown in FIG. 3 defines a cylindrical piston edge portion 30. This is the condition of the roll-off piston before bending the edge portion 30 over the bead 12.

To simplify the manufacture of the flexible member, the geometry of the surface of the flexible member and the manufacturing mold corresponding thereto are so configured with respect to the relief that a backcut is not needed. Substantially avoiding a backcut facilitates removal from the mold.

The mounting of the flexible member 4 on the roll-off piston 8 should be mechanically tight as well as being pneumatically tight. For this purpose, the bead-shaped thickening of the end portion of the flexible member, which faces toward the piston, has a sealing surface 14. This sealing surface 14 is not horizontal for a flexible member 4 standing perpendicularly; instead, this sealing surface is tilted at an angle α to a perpendicular 18 standing on the longitudinal axis 16 of the flexible member. This angle is α=45° as shown in the drawings. The angle can, however, also assume a larger value. Angles between 45° and 65° have been shown to be especially suitable with respect to the operation wherein the molds are removed in the production of the flexible member 4 as well as for mounting the bead 12 on the bent-over edge portion 30 of the piston 8.

The bead 12 at the piston end includes a bead core (annular member) 24 made of steel or steel wire to increase strength.

Figure 3:
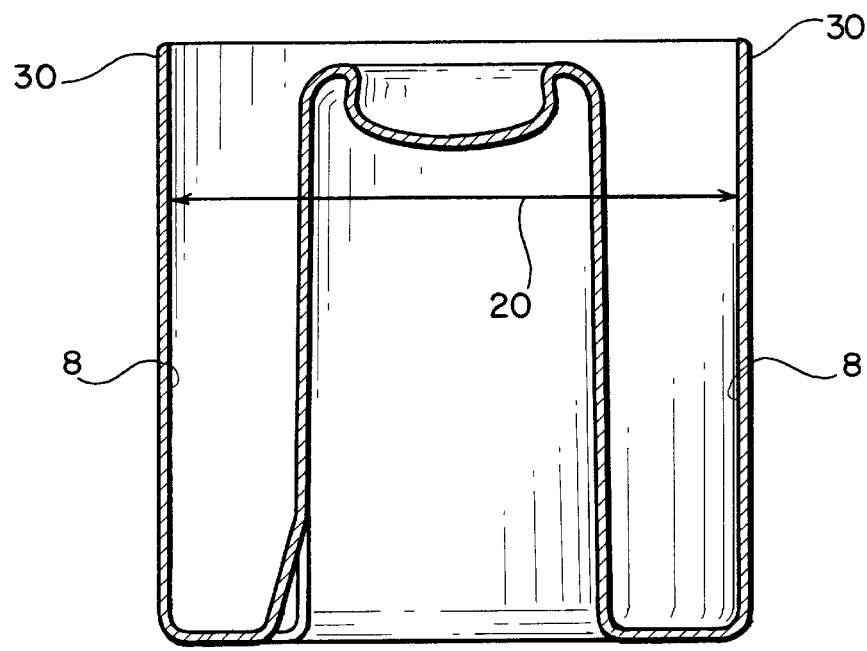
FIG. 3 is an embodiment of the roll-off piston, in longitudinal section which is suitable for attaching the flexible member according to a feature of the invention; and, FIG. 4 is the piston end of a flexible member in accordance with German patent publication 298 08 109.
Figure 4:
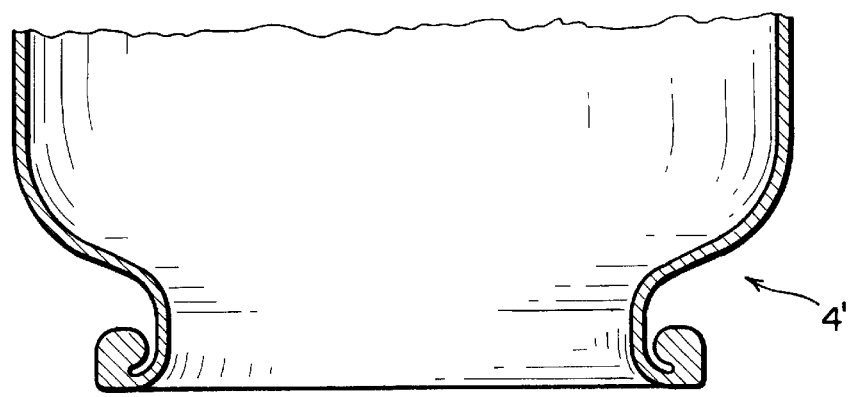

The diameter 22 of the bead 12 is matched to the diameter 26 of the piston wall in the region of the piston. The bead 12 of the flexible member 4 does not hook into a prebent-over piston edge portion 30. The piston edge portion 30 is not bent over in advance as shown in FIG. 3. The edge portion 30 is first configured to be cylindrical and is closed about the bead 12 of the flexible member 4 only by the method step of bending over the edge portion. At the end of the step of bending over the edge portion, the bead 12 is tightly surrounded by the bent-over edge portion 30 of the roll-off piston 8. The piston end seal surface 14 of the flexible member 4 is rotated to 90° referred to the horizontal and is, in this way, in contact surface engagement with the upper end of the piston wall as shown in FIG. 2c. More specifically, the piston edge portion 30 is, in total, bent over inwardly by approximately 270°.

This operation of bending over the edge portion takes place with a special tool.

The diameter 22 of the flexible member 4 is less in the region of the bead than the diameter 20 of the remainder of the flexible member to improve the roll-off operation of the flexible member 4 on the outer surface of the roll-off piston 8.

If a shock absorber is to be integrated into the air spring 2, then the shock absorber can be built into the open piston 8 as a separate part.

It is understood that the foregoing description is that of the preferred embodiments of the invention and that various changes and modifications may be made thereto without departing from the spirit and scope of the invention as defined in the appended claims.

What is claimed is:

1. A rolling-lobe flexible member for an air spring including a cover plate and a roll-off piston having a piston wall, the rolling-lobe flexible member comprising:

an annular flexible member defining a longitudinal axis and having a first end connectable to said cover plate and having a second end connectable to said roll-off piston;

said flexible member having a bead formed on said second end and said bead having a sealing surface for contact engagement with said roll-off piston when mounted in said air spring; and, said bead being vulcanized on said flexible member so as to cause said sealing surface to lie tilted at an acute angle (α) with respect to a perpendicular to said longitudinal axis before a mounting thereof in said air spring.

2. The rolling-lobe flexible member of claim 1, wherein said acute angle (α) lies in the range of 45° to 65°.

3. The rolling-lobe flexible member of claim 1, said flexible member having a first diameter above said second end and a second diameter at said second end; and, said second diameter being less than said first diameter.

4. The rolling-lobe flexible member of claim 1, wherein said roll-off piston has a diameter; said bead has a rigid bead core; and, said rigid bead core having a diameter matched to said diameter of said piston wall.

5. A method of making a rolling-lobe air spring which includes: a bendable cover plate; a roll-off piston having a cylindrical wall defining an inner wall surface and an upper end portion; a rolling-lobe flexible member defining a longitudinal axis and having a first end connected to said bendable cover plate and having a second end facing toward said roll-off piston; and, said rolling-lobe flexible member having a bead to be formed on said second end and said bead having a sealing surface for contact engagement with said roll-off piston; and, the method comprising the steps of:

forming said bead on said flexible member by vulcanization in such a manner that said sealing surface lies tilted at an acute angle (α) with respect to a perpendicular to said longitudinal axis; and, connecting said roll-off piston to said second end of said flexible member by bending over said upper end portion inwardly toward said longitudinal axis so as to cause said sealing surface to come to rest against said inner wall surface in a 90° position to said perpendicular when the step of bending over said upper end portion is completed.

6. The method of claim 5, wherein said upper end portion has an upper edge and said upper edge is moved through approximately 270° as said upper edge portion is bent over so as to be approximately parallel to said inner wall surface.

7. The method of claim 5, wherein said acute angle ($\alpha$) lies in the range of 45° to 65°.

* * * * *